United States Patent [19]

Riall

[11] Patent Number: 4,853,751
[45] Date of Patent: Aug. 1, 1989

[54] DISC FILM AND LENS SUPPORTING UNIT
[75] Inventor: James D. Riall, Rochester, N.Y.
[73] Assignee: Eastman Kodak Company, Rochester, N.Y.
[21] Appl. No.: 126,810
[22] Filed: Nov. 30, 1987
[51] Int. Cl.[4] .............................................. G03B 27/62
[52] U.S. Cl. ...................................... 355/76; 355/53; 355/64; 354/121
[58] Field of Search .................. 354/121, 275; 355/64, 355/75, 76, 74, 53

[56] References Cited

U.S. PATENT DOCUMENTS

| | | | |
|---|---|---|---|
| 2,494,495 | 1/1950 | Tait et al. | 354/121 X |
| 3,292,485 | 12/1966 | Mey | 355/74 X |
| 4,203,664 | 5/1980 | Clifton et al. | 355/64 |
| 4,204,733 | 5/1980 | Modney | 355/64 |
| 4,313,677 | 2/1982 | Stewart | 355/76 |
| 4,396,282 | 8/1983 | Anderson | 355/76 |
| 4,396,283 | 8/1983 | Anderson | 355/76 |
| 4,443,100 | 4/1984 | Zamek | 355/76 |
| 4,521,105 | 6/1985 | Mukae et al. | 355/64 |

Primary Examiner—A. A. Mathews
Attorney, Agent, or Firm—James A. Smith

[57] ABSTRACT

A disc film and lens supporting unit (10) is assembled on a structural base plate (11). An exposure aperture (96) extends through the unit (10), and a film suporting spindle (25) is provided rotatably to support a disc film (33) such that the image frames (95) therein may be successively indexed into alignment with the exposure aperture (96). A disc film support and translational transport mechanism (18) is provided to move the spindle (25) between a load/unload position and a processing position in response to movement of a transport plate assembly (13) that is operatively connected both to the structural base plate (11) and the disc film support and translational transport mechanism (18). A film engaging mechanism (85) is presented from a film flattening assembly (75) to flatten at least that portion of the disc film (33) in register with the exposure aperture (96). A first interlocking arrangement (45, 61 and 70) is provided to disengage the film engaging mechanism (85) before the disc film (33) can be moved between the load/unload position and the processing position. A second interlocking arrangement (125, 150 and 151) is provided to disengage the film engaging mechanism (85) before the disc film (33) can rotated by the rotational translation mechanism (125) to index the disc film (33) and thereby bring successive image frames (95) into register with the exposure aperture (96).

35 Claims, 8 Drawing Sheets

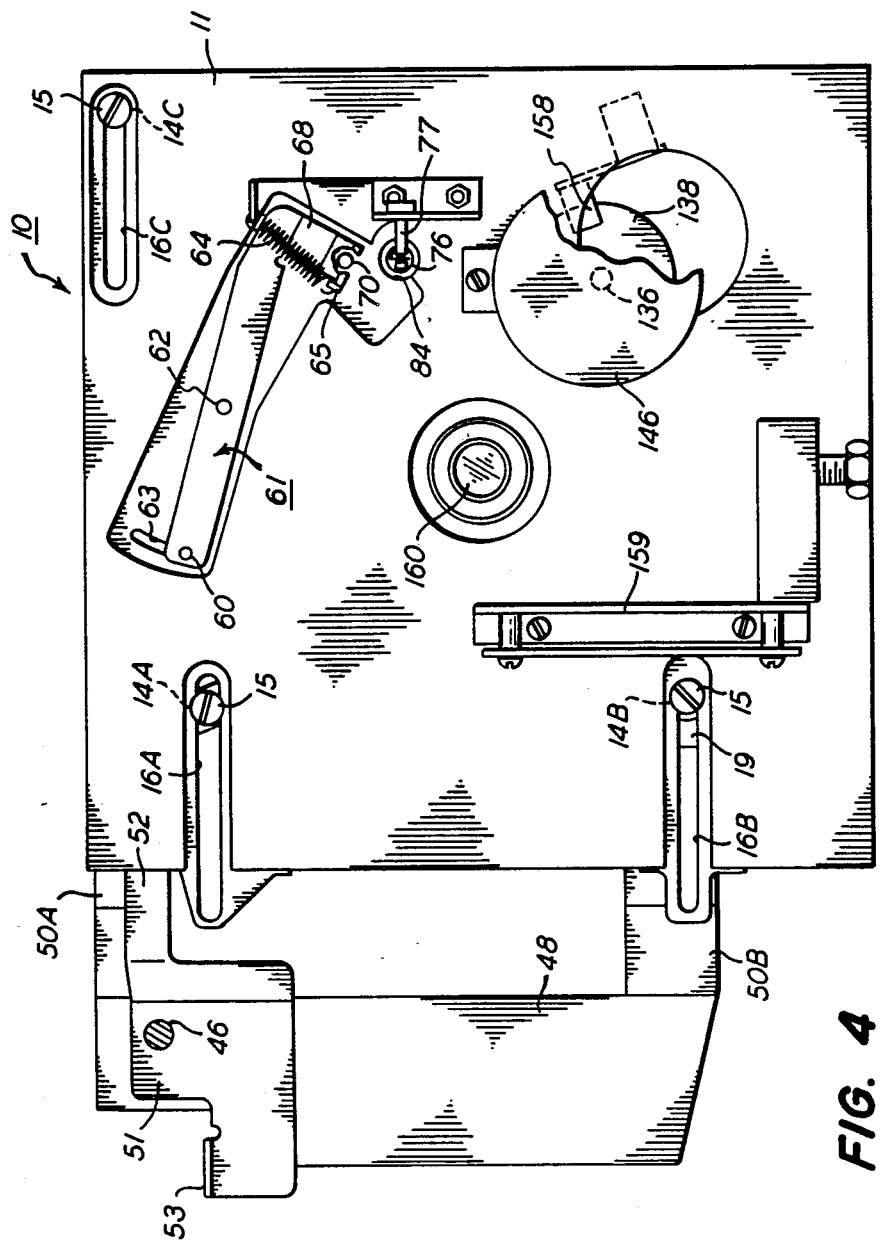

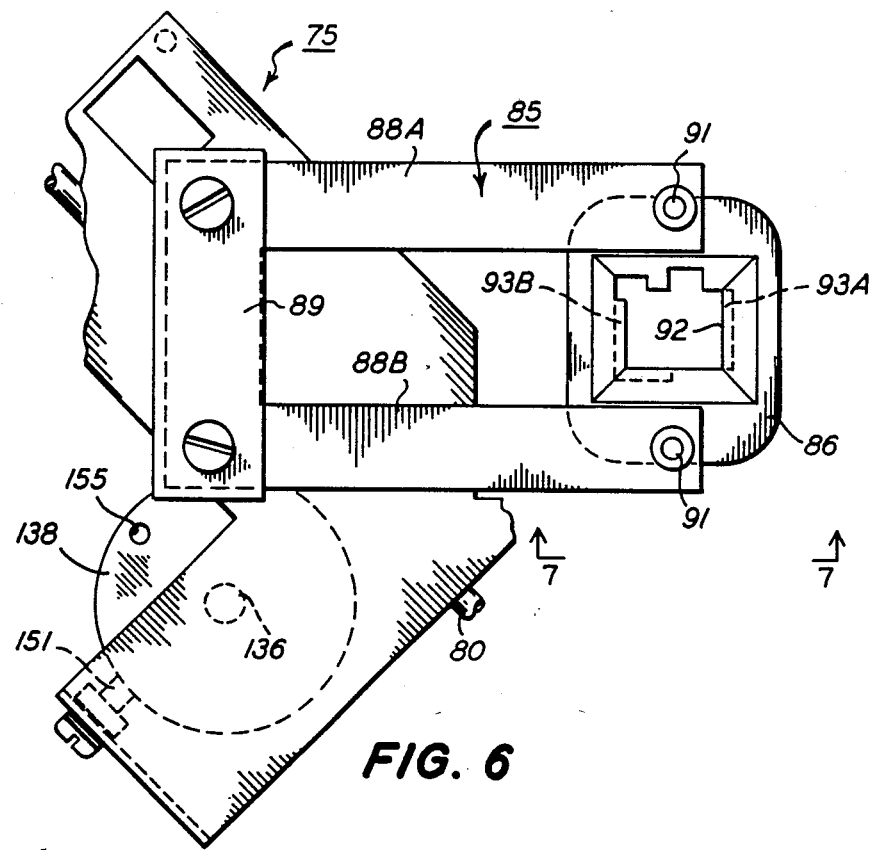
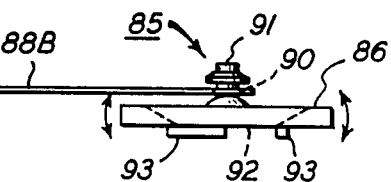
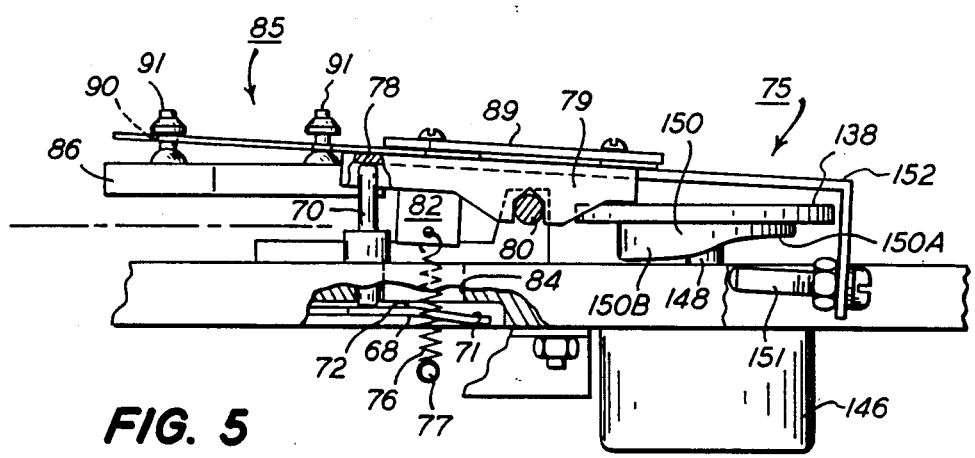

DISC FILM AND LENS SUPPORTING UNIT

TECHNICAL FIELD

The present invention relates to a device for positioning and sequentially indexing a film disc, popularly designated as a "disc film," in an apparatus for producing photographic prints. More particularly, the present invention is directed to a device for supporting the disc film such that it can be translated between a load/unload position and a processing position and, when in the processing position, rotated to bring successive image frames into precise alignment with an exposure aperture through the device. Specifically, the present invention is directed to a film positioning and indexing device which incorporates a film flattening assembly to assure that the specific image frame in register with the exposure aperture will lie in a plane disposed transversely of the exposure aperture, and which employs an interlock means to assure that the film engaging mechanism is not in contact with the disc film at the time the disc film is moved, either translationally or rotationally

BACKGROUND OF THE INVENTION

In recent years the disc film has become quite popular. The disc film employs a circular hub carrying an annulus of photosensitive film that is provided with a plurality of image frames spaced circumferentially within the annulus. Cameras which employ these disc films index the hub so that the image frames are successively exposed.

Procedures and equipment have been devised to develop the plurality of exposed image frames without removing the film annulus from the hub. It is also a requirement that the plurality of developed image frames on each disc film be printed without removing the film annulus from the hub.

The art pertinent to the apparatus heretofore employed in holding and indexing the disc film for the purpose of printing pictures from the successive plurality of image frames on a disc film are rather fully discussed in U.S. Pat. No. 4,443,100 and need not be reiterated herein. In fact, the apparatus disclosed in said U.S. Pat. No. 4,443,100 may be acceptable when employed in conjunction with printers which relatively slowly cycle from one image frame to the next.

With the popularity of the disc film, however, it has become imperative that the disc film be capable of being inserted quickly and easily into the apparatus employed to hold and index the disc film and thereafter be rapidly indexed from image frame to image frame for printing of the successive image frames contained herein.

The prior art has recognized the fact that each image frame must be flattened and held in a planar disposition oriented transversely of the exposure aperture during the actual exposure of the developed film onto the printing medium, but the means by which that desired result has been heretofore accomplished has not adapted itself to printing, primarily because the release of the mechanism by which the film was held flat during the actual exposure has not fully released the disc film before the disc film began to rotate during the indexing procedure. Full release of the film prior to initiating the indexing procedure is important for avoiding scratching or otherwise deleteriously effecting the image frame.

Similar considerations apply during the insertion and removal of the disc film into the holding mechanism. Presently known structural arrangements of which I am aware do not release the disc film before such removal operation is begun, nor do they insure that the holding mechanism will not engage the disc film until such insertion operation is complete.

SUMMARY OF THE INVENTION

It is, therefore, a primary object of the present invention to provide an improved disc film supporting and manipulating unit wherein the film is flattened only during selective operations of the unit.

It is a another object of the present invention to provide a disc film supporting and manipulating unit, as above, wherein a unique interlock means is provided to disengage the film engaging mechanism from the disc film before the disc film is moved onto the processing position.

It is a further object of the present invention to provide a disc film supporting and manipulating unit, as above, wherein a unique film engaging mechanism is disengaged from the disc film before the disc film is moved in the processing procedure.

It is still another object of the present invention to provide a disc film supporting and manipulating unit, as above, wherein a unique interlock means is provided to disengage the film engaging mechanism from the disc film before the disc film is rotatably indexed to bring successive image frames into alignment with the exposure aperture.

It is yet another object of the present invention to provide a disc film supporting and manipulating unit, as above, wherein the same mechanism for indexing the disc film also drives the film engaging mechanism during indexing operations.

These and other objects of the invention, as well as the advantages thereof over existing and prior art forms, which will be apparent in view of the following detailed specification, are accomplished by means hereinafter described and claimed.

In general, a disc film and lens supporting unit embodying the concepts of the present invention is assembled on a structural base plate. An exposure aperture extends through the unit, and a spindle is provided rotatably to support a disc film such that the image frames therein may be successively indexed into alignment with the exposure aperture.

A mechanism is also provided to transport the spindle from a "load/unload" position to a "processing" position in response to movement of a transport plate assembly that is operatively connected to the structural base plate.

A film engaging mechanism is provided to flatten at least that portion of the disc film in register with the exposure aperture. Interlock means are provided to prevent movement of the disc film before disengagement of the film engaging mechanism from the disc film.

One exemplary embodiment of a disc film and lens supporting unit embodying the concepts of the present invention is shown by way of example in the accompanying drawings and is described in detail without attempting to show all of the various forms and modifications in which the invention might be embodied; the invention being measured by the appended claims and not by the details of the specification.

BRIEF DESCRIPTION OF THE DRAWINGS

FIG. 4 is rear elevational view of the unit depicted in FIG. 1;

FIG. 5 is an enlarged section taken substantially along line 5—5 in FIG. 2 depicting the film flattening assembly in side elevation and with the structural base plate of the unit partially broken away more clearly to reveal the mechanisms by which the film flattening assembly is actuated;

FIG. 6 is an enlarged frontal elevation of the film flattening assembly oriented in the same manner as that assembly is depicted in FIG. 2;

FIG. 7 is a partial section taken substantially along line 7—7 of FIG. 6 depicting the film engaging component, and one of its support arms, in side elevation;

DESCRIPTION OF AN EXEMPLARY EMBODIMENT

A disc film and lens supporting unit embodying the concepts of the present invention is designated generally by the numeral 10 on the attached drawings. The unit 10 is assembled on a structural base plate 11, and the base plate 11 may be conveniently mounted in a printing exposure unit (not shown) in a customary fashion, as is well known to the art, by virtue of a plurality of mounting feet 12 presented from the structural base plate 11.

Figure 2:
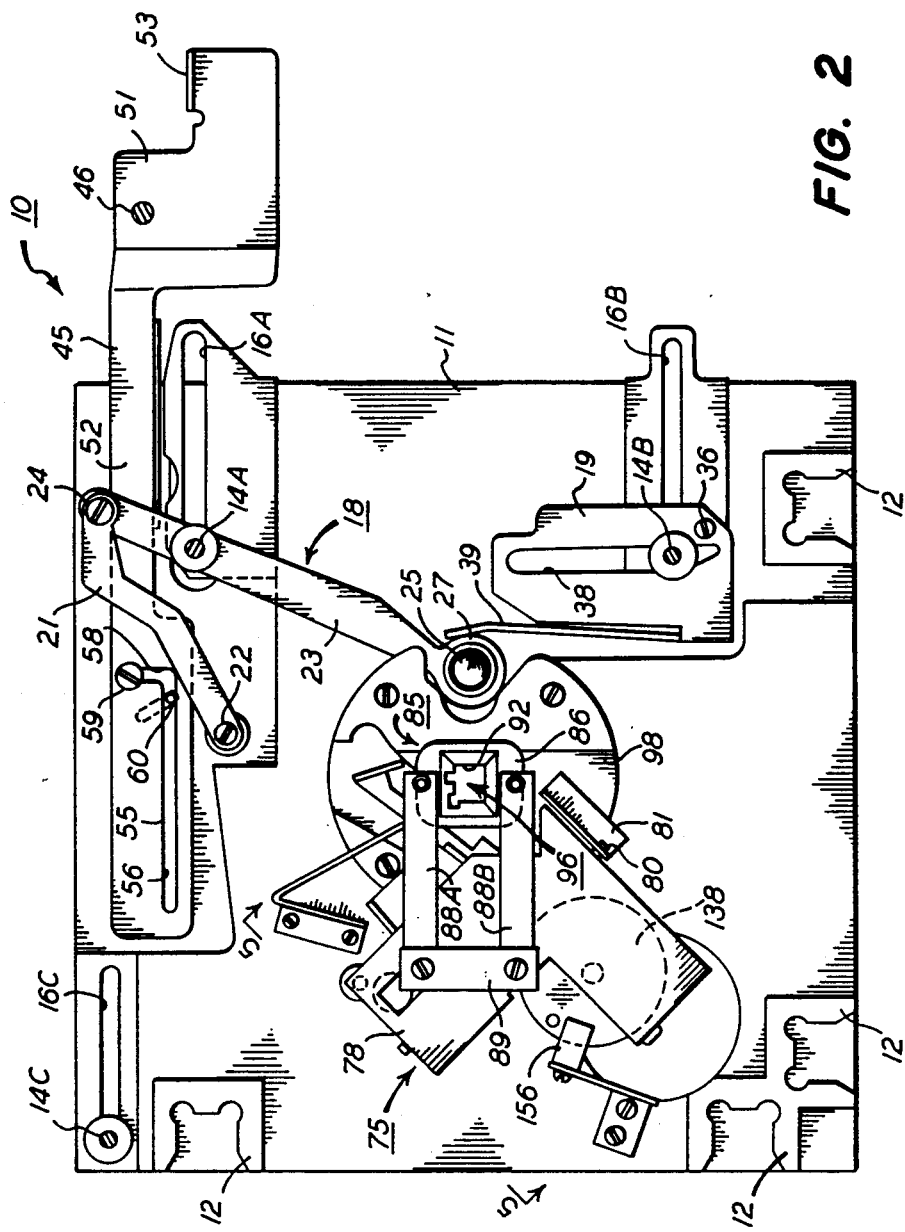
FIG. 2 is a view similar to FIG. 1 but with the transport plate and the disc film, both of which are depicted in FIG. 1, removed more clearly to reveal the translational transport mechanism, and the disc film supporting spindle carried thereon, locked in the processing position.
Figure 3:
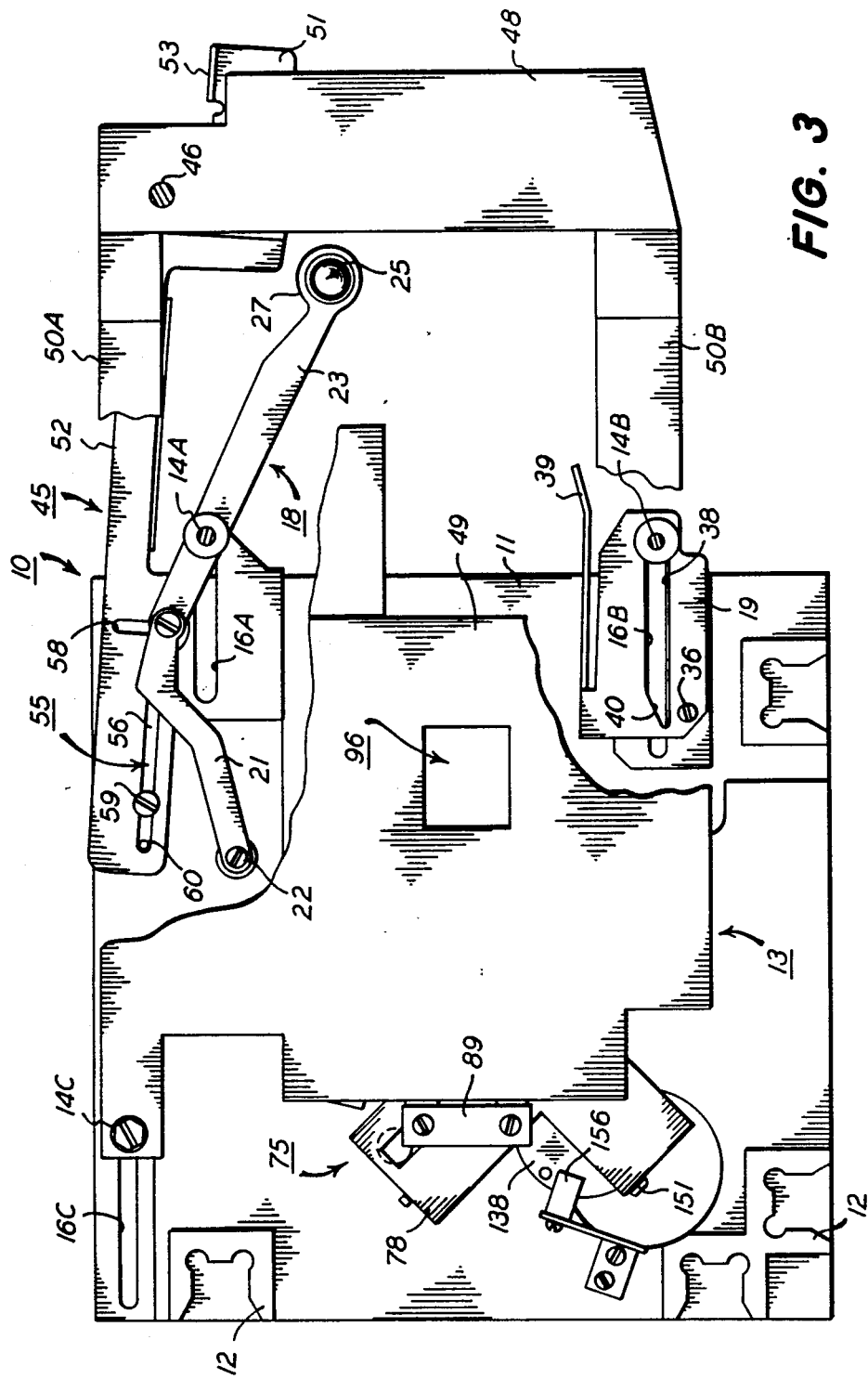
FIG. 3 is also a view similar to FIG. 1 but with the transport plate partly broken away more clearly to reveal the translational transport mechanism, and the disc film supporting spindle carried thereon, disposed in the load/unload position.

A transport plate assembly 13 is slidably supported on the structural base plate 11 by a plurality of connector pins 14. The head 15 (FIG. 4) of each connector pin 14 is located such that the shaft of each connector pin 14 is captured within, and slidable along, a guideway 16 provided in association with the structural base plate 11. As best seen in FIGS. 2, 3 and 4, the connector pin 14A is slidably received within guideway 16A. This interconnection between the transport plate assembly 13 and the structural base plate 11, as will be hereinafter more fully explained, serves as the actuator for the disc film support and translational transport mechanism 18.

The connector pin 14B is slidably received within guideway 16B. This interconnection between the transport plate assembly 13 and the structural base plate 11, also as will hereinafter be more fully explained, serves as the actuator for the lock block 19.

Finally, the connector pin 14C is slidably received within guideway 16C. This interconnection between the transport plate assembly 13 and the structural base plate 11, because it is the third interconnection and because it is located in a spaced, triangular disposition relative to the other two interconnections, serves as the stabilizing interconnection to assure that the transport plate assembly 13 does not yaw as it is selectively moved linearly back and forth along its desired direction of motion 20 (FIG. 1) relative to the structural base plate 11.

The disc film support and translational transport mechanism 18 utilizes a pair of links that are joined for articulation. Specifically, one end of a pivot link 21 is secured to the structural base plate 11 by a pivot pin 22. The location of the pivot pin 22 is fixed relative to the base plate 11. The other end of the pivot link 21 is connected to one end of a spindle supporting link 23, as by the pivot pin 24. The pivot pin 24 permits the links 21 and 23 to articulate, one with respect to the other, and because the pivot pin 24 is not connected to any third member, the location of the articulating connection is free to move with the pivot link 21 as the pivot link 21 swings about the pivot pin 22. A disc film supporting spindle 25 is presented from that end of the spindle supporting link 23 which is remote from the pivot pin 24.

The connector pin 14A is operatively connected to the spindle supporting link 23 as well as to the base plate 11 and the transport plate assembly 13. As best depicted in FIG. 2, the connector pin 14A may be pivotally secured to the spindle supporting link 23 at a distance—measured from that end of the supporting link that is connected to the pivot link 21 for articulation—which is equal to approximately one-third the overall length of the supporting link 23. By selecting the location of the pivotal connection between the connector pin 14A and the spindle supporting link 23 along the length of the supporting link 23, one is able to predetermine the translational throw of the spindle 25 in response to the distance traversed by the pin 14A along the guideway 16A.

Figure 8:
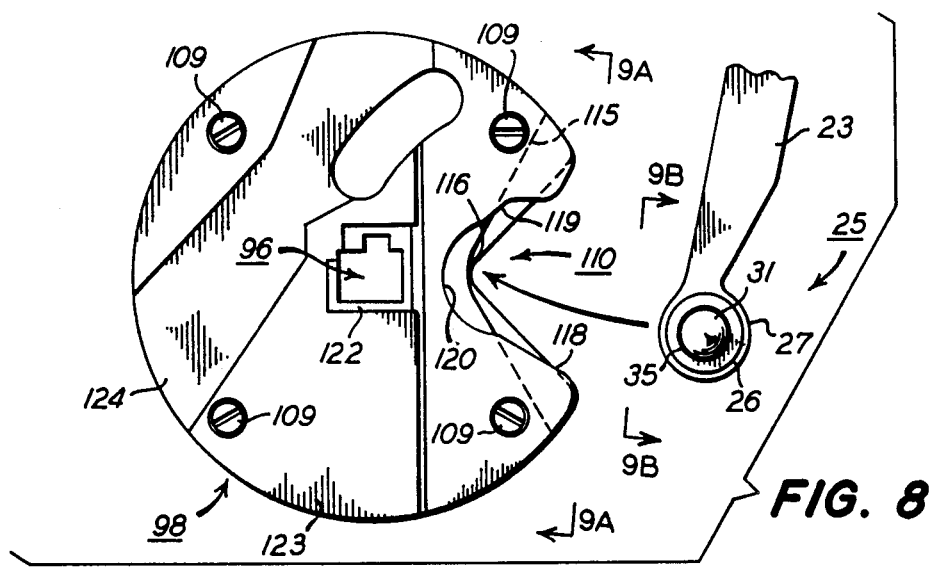
FIG. 8 is an enlarged plan view of the film gate oriented in the same manner as depicted in FIG. 2 but, for clarity, with the film flattening assembly removed and with the disc film supporting spindle and the spindle support link depicted in spaced relation.
Figure 9:
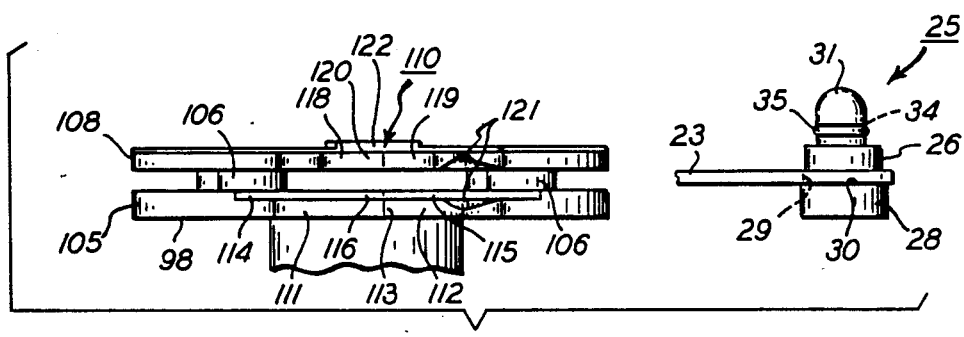
FIG. 9 is a composite side elevation of the components depicted in FIG. 8 with the elevation of the film gate taken substantially along line 9A—9A of FIG. 8 and with the elevation of the supporting spindle and the spindle support link taken substantially along line 9B—9B of FIG. 8.

With more particular reference to FIG. 9, it will be observed that the spindle 25 may have a cylindrical barrel portion 26 that is stepped down from the base portion 28 to be press fit through a bore 29 in the head 27 (FIG. 8) of the spindle supporting link 23. The shoulder 30 defined by the transition between the barrel and the base portions 26 and 28, respectively, may engage the head 27 of the supporting link 23 to define the appropriate location of the base portion 28 relative to the supporting link 23 when the barrel portion 26 is secured within bore 29.

The barrel portion 26 is, in turn, stepped down to define a dog 31 having a diameter which will permit the dog 31 to be closely, but rotatably, received within the central mounting aperture 32 (FIGS. 1 and 10-12) of a disc film 33. The dog 31 may be provided with a circumferential recess 34 adapted to receive an elastic retention ring 35, such as the O-ring depicted.

The lock block 19 may be pivotally supported from the structural base plate 11 by virtue of a mounting pin 36. When the disc film support and translational transport mechanism 18 is in the load/unload position depicted in FIG. 3, the lock block 19 is oriented such that a slideway 38 therein is disposed in register with the guideway 16B in the structural base plate 11. The connector pin 14B operatively interacts with the lock block 19 as well as with the base plate 11 and the transport plate assembly 13. The operative interaction of the pin 14B with the lock block 19 is achieved by passing the pin 14B closely, but slidably, through the slideway 38.

A latch arm 39 is affixed to one side of the lock block 19. The latch arm 39 is preferably resilient and may, therefore, be made of a spring steel in order to be able to assert a biasing, retention force against the head 27 of the spindle supporting link 23 when the translational transport mechanism 18 has positioned the spindle 25, and the disc film 33 carried thereon, in the processing position depicted in FIG. 2.

A cam surface 40 is provided at one end of the slideway 38. The cam surface 40 is inclined transversely across the slideway 38 to be operatively interactive with the connecting pin 14B. Specifically, movement of the connecting pin 14B against the inclined cam surface 40 will effect angular rotation of the lock block 19 about the mounting pin 36 to the degree necessary to bring the latch arm 39 into biasing engagement with the head 27 of the spindle supporting link 23, as will be hereinafter more fully explained in conjunction with the operational description of the unit 10.

A slide latch 45 is secured to the transport plate assembly 13 by a pivot pin 46. As may best be seen from FIGS. 1 and 3, the transport plate assembly 13 has a handle bar 48 that is located in spaced relation from the main body portion 49 of the transport plate assembly 13. In fact, a pair of extension arms 50A and 50B extend between the body portion 49 and the handle bar 48 securely to conjoin the handle bar 48 to the body portion 49 of the transport plate assembly 13. The extension arms 50 provide sufficient spacing between the handle bar 48 and the body portion 49 to permit an operator comfortably to insert his fingers therebetween in order to facilitate manually grasping the handle bar 48. As shown, the pivot pin 46 may be secured to the handle bar 48.

The slide latch 45 presents an actuating lever 51 on one side of the pivot pin 46, and a throw lever 52 extends outwardly from the pivot pin 46 in the opposite direction from the actuating lever 51. The actuating lever 51 presents a lip 53 which can be conveniently engaged by the thumb of the operator's hand which grasps the handle bar 48.

The end portion of the throw lever 52 most remote from the pivot pin 46 is penetrated by a guide slot 55. The guide slot 55 has a main channel portion 56 which is oriented in generally parallel relation with the back and forth direction of motion 20 desired for the transport plate assembly 13. The guide slot 55 also includes a dogleg channel portion 58 which communicates with, but which extends generally perpendicularly relative to, the main channel portion 56. A reaction pin 59 is secured to the structural base plate 11 and extends through the guide slot 55. When the reaction pin 59 is received within the dogleg channel portion 58 of the guide slot 55 the interaction between the reaction pin 59 and the dogleg channel portion 58 serves as a locking arrangement, or interlock, which precludes longitudinal translation of the slide latch 45. On the other hand, when the reaction pin 59 is received within the main channel portion 56 the interaction therebetween serves as a guiding arrangement which permits the slide latch 45 to be translated longitudinally of itself.

As such, it should be apparent that when the reaction pin 59 is received within the dogleg channel portion 58, the transport plate assembly 13 is immobilized. To the contrary, when the reaction pin 59 is received within the main channel portion 56 the transport plate 13 may itself be translated relative to the structural base plate 11, and along the direction of motion 20, for a distance substantially determined by the longitudinal extent of the main channel portion 56.

A drive pin 60 is also received within the main channel portion 56 of the guide slot 55. The drive pin 60 is presented from one end of an interlock lever 61 (FIG. 4) that is preferably mounted on that side of the structural base plate 11 opposite to the side along which the slide latch 45 is located. In fact, the interlock lever 61 is supported from the structural base plate 11 by a pivot pin 62 which penetrates the medial portion of the interlock lever 61. The drive pin 60 extends through an opening 63, such as the arcuate aperture depicted, in the structural base plate 11 to be received in the main channel 56 of the guide slot 55. The end of the interlock lever 61 opposite the drive pin 60 is attached to a spring 64 that extends between a connecting tab 65 on the interlock lever 61 and an anchor post 66 presented from the structural base plate 11. The spring 64 biasingly urges the interlock lever 61 to swing in a counterclockwise direction about the pivot pin 62, as viewed in FIG. 4. This biasing action applied to the interlock lever 61 by spring 64 forces the drive pin 60 against one side of the main channel 56 in the guide slot 55 which urges the slide latch 45 to rotate counterclockwise about pivot pin 46, as viewed in FIG. 2. The biasing action applied by the spring 64 thus maintains the reaction pin 59 within the dogleg channel portion 58 of the guide slot 55 to immobilize the transport plate assembly 13 until such time as an operator applies sufficient thumb pressure to the lip 53 on the slide latch 45 to overcome the biasing action of spring 64 and effect rotation of the slide latch 45 in a clockwise direction as viewed in FIG. 2 in order to align the main channel 56 of the guide slot 55 with the reaction pin 59. Only by that action can the operator of the unit 10 disengage the interlock effected by engagement of the reaction pin 59 with the dogleg channel 58 to permit movement of the transport plate assembly 13.

Because of the interaction between the main channel 56 of the guide slot 55 and the drive pin 60, clockwise rotation (as viewed in FIG. 2) of the slide latch 45 induced when the operator applies thumb pressure to the lip 53 also effects clockwise rotation of the interlock lever 61, as viewed in FIG. 4. Clockwise rotation of the interlock lever 61 moves the cam flange 68 which extends transversely outwardly from the interlock lever 61, as best seen in FIGS. 4 and 5, beneath an actuating pin 70.

In the position of the interlock lever 61 depicted in FIG. 4 the pin 70 rests upon the flat, offset surface 71 of the cam flange 68. However, as the interlock lever 61 is rotated clockwise, an inclined, camming ramp 72 is moved beneath the actuating pin 70 axially to translate the actuating pin 70 to rotate the film flattening assembly 75 (clockwise as viewed in FIG. 5) against the biasing action of spring 76.

The film flattening assembly 75 includes a pivot plate 78, and the pivot plate 78 incorporates a bearing bracket 79 which engages a trunnion rod 80 supported in spaced relation to the structural base plate 11 by a pair of gudgeons 81A and 81B extend outwardly from the structural base plate 11. One end of the spring 76 is secured to a connecting tab 82 presented from the pivot plate 78, and, for convenience, the other end may be secured to an anchor post 77 on the opposite side of the structural base plate 11, with the spring 76 extending through a bore 84 in the base plate 11.

Normally, the spring 76 biases the film flattening assembly 75 to maintain a film engaging mechanism 85 in firm contact with a disc film 33 carried on the spindle 25 when the latter is located in the processing position. when the actuating pin 70 rests upon the flat offset surface 71 of the camming flange 68, the pin 70 does not interfere with the biasing action of the spring 76 as it forces the film engaging mechanism 85 against the disc film 33. However, when the camming ramp 72 axially translates the actuating pin 70 to engage the pivot plate 78, as depicted in FIG. 5, the pivot plate 78 is thereby rotated clockwise about the axis of the trunnion rod 80 to raise the engaging mechanism 85 of the film flattening assembly 75.

The film engaging mechanism 85 comprises a mask 86 that is supported from the pivot plate 78 by a pair of resilient arms 88A and 88B which may effectively be made of spring steel. The inboard end of each arm 88 is secured to the pivot plate 78, as by the common anchor plate 89 depicted, and the outboard ends thereof are bored, as at 90, to receive the lost motion connectors 91 which are presented from the mask 86. The mask 86 is provided with an aperture 92 (FIG. 6), the configuration of which is designed to outline the successive image frames on the disc film 33 in a manner well known to the art. The mask 86 also presents contacting ridges 93 which are located to engage the disc film 33 outside the site area of each image frame. As will be observed by reference to FIG. 10, the image frames 95 are spaced circumferentially about the periphery of the disc film 33, with each image frame 95 being oriented radially. As such, the radially inner corners of the successive image frames are disposed in relatively contiguous juxtaposition whereas the radially outer corners of the successive image frames are disposed in relatively spaced relation.

Accordingly, the contacting ridges 93 are disposed to accommodate the spacing of the image frames 95 about the disc film 33 and yet be located so as to assure that they can effect a planar flattening of that image frame 95 positioned in register with the hereinafter described exposure aperture 96 through the hereinafter described film gate 98. As depicted in FIG. 6, the contacting ridge 93A is disposed to engage the disc film 33 adjacent that edge 99 of the image frame 95 which delineates the radially innermost edge thereof. Contacting ridge 93B, on the other hand, engages the disc film 33 along the radially outermost edge 100 of the image frame 95 and partially along the radially outer portion of one radially oriented edge 101 of the image frame 95.

When a disc film 33 carried on the spindle 25 is disposed in the processing position it will be necessary to index the disc film 33 so that successive image frames 95 are brought into register with the exposure aperture 96 through the film gate 98.

The film gate 98, which is best depicted in FIGS. 2, 8 and 9, may conveniently be fabricated from two stacked members—viz., a lens pedestal 105 and an aperture plate 108—either one or both of which may have a plurality of spacing bosses 106 formed therein. The two members forming the film gate 98 may be secured to each other, and to the structural base plate 11, by a plurality of machine screws 109. When the two members are secured to the structural base plate 11 a central aperture in each member will be disposed in register with the apertures in the other member as well as with corresponding aperture through the base plate 11 and the body 49 of the transport plate assembly 13 to form the exposure aperture 96 which extends through the entire unit 10 as well as the film gate 98. Both members are also notched, and the two notches are disposed in accurate register to form an aligning recess 110 in the film gate 98.

The side edges 111 and 112 of the notch 113 in the lens pedestal 105 are angularly disposed firmly to engage the base 28 of the spindle 25 when the disc film support and translational transport mechanism 18 has translated the spindle 25 to the processing position depicted in FIG. 2. The side edges 114 and 115 of a recess 116 in the lens pedestal 105 are angularly disposed to clear the head 27 of the spindle supporting link 23 when the spindle 25 is located in the processing position, and the side edge 114 is also disposed to assure that it will also clear the remainder of the supporting link 23. In that way the lens pedestal 105 will not engage, and therefore will not interfere with, the supporting link 23. Finally, the side edges 118 and 119 of the notch 120 in the aperture plate 108 are angularly disposed to engage the barrel portion 26 of the spindle 25 when the spindle is located in the processing position.

By having the base 28 of the spindle 25 engage the notch 113 in the lens pedestal 105 and the barrel portion 26 engage the notch 120 in the spaced aperture plate 108, engagement with the head 27 of the supporting link 23 by the latch arm 39 on the lock block 19 will effect a force application to the spindle 25 that will tend to assure a consistent and stable disposition of the spindle 25 relative to the film gate 98.

To assure that the supporting link 23 and the spindle 25 will be permitted unrestricted access into the alignment recess 110 of the film gate 98, the spaced lens pedestal 105 and aperture plate 108, respectively, provide opposed entry surfaces that are flared, as at 121, to guide the supporting link 23 into position, if required.

The aperture plate 108 presents a raised rim 122 which substantially circumscribes the exposure aperture 96. The rim 122 is designed to engage the disc film 33 closely around the perimeter of each image frame 95 as that frame is brought into register with the exposure aperture 96. The contacting ridges 93A and 93B are disposed in opposition to the raised rim 122 such that when the film engaging mechanism 85 is biased against the disc film 33, the image frame 95 will be oriented and maintained transversely of the exposure aperture 96 and in the desired planar disposition between the raised rim 122 and the contacting ridges 93A and 93B.

The surface 123 of the aperture plate 108 is also preferably recessed as at 124, to accommodate certain components of the hereinafter described rotational translation mechanism 125.

Figure 10:
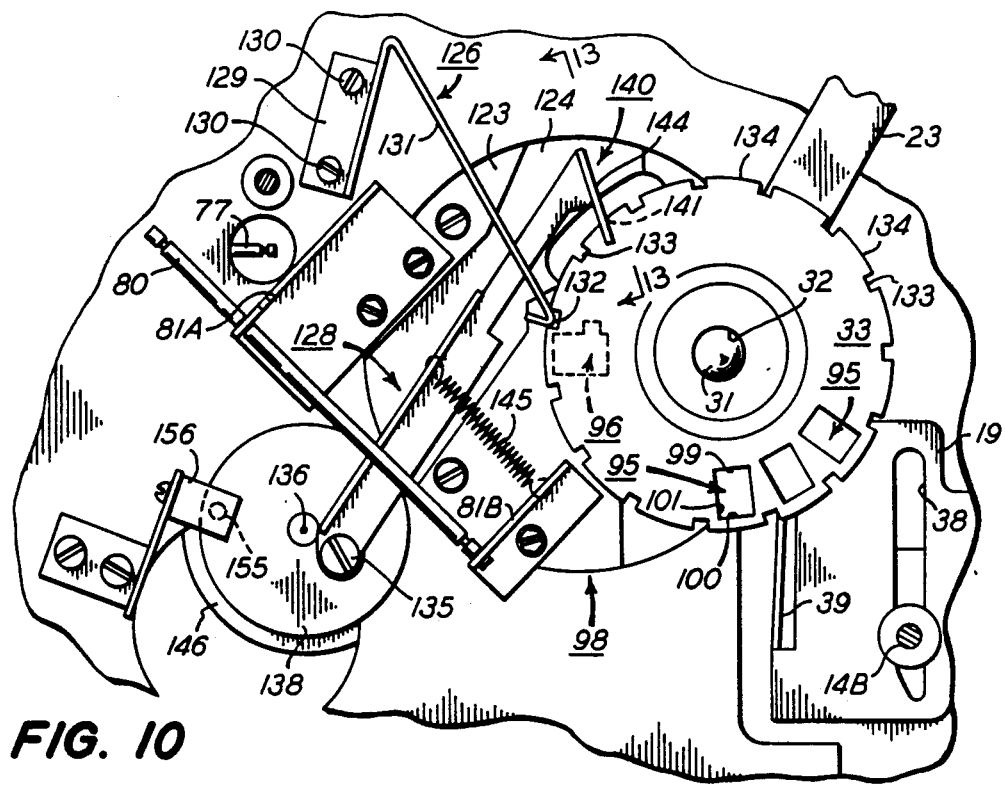
FIG. 10 is an enlarged area of FIG. 2 with the film flattening assembly removed to depict the film rotational transport mechanism disposed in the preferred position for projecting the image of a selected frame in the disc film through the exposure aperture of the film gate.
Figure 11:
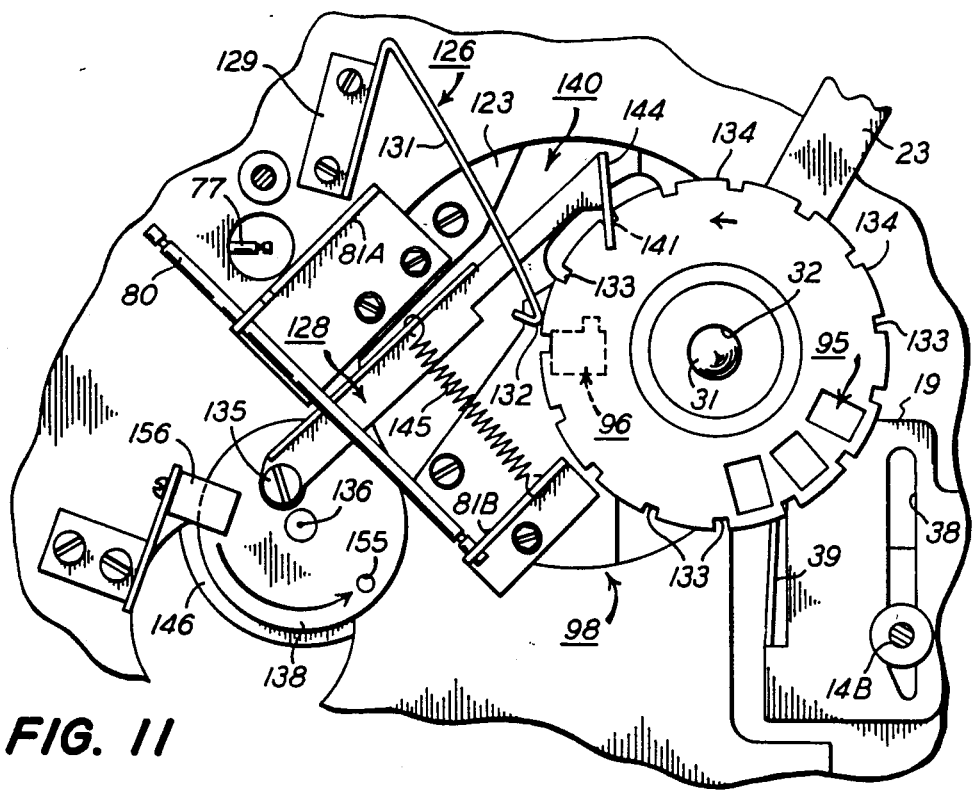
FIG. 11 is a view similar to that represented in FIG. 10 but with the film rotational transport mechanism depicted in the process of indexing the disc film to align the next successive film frame with exposure aperture through the film gate.
Figure 12:
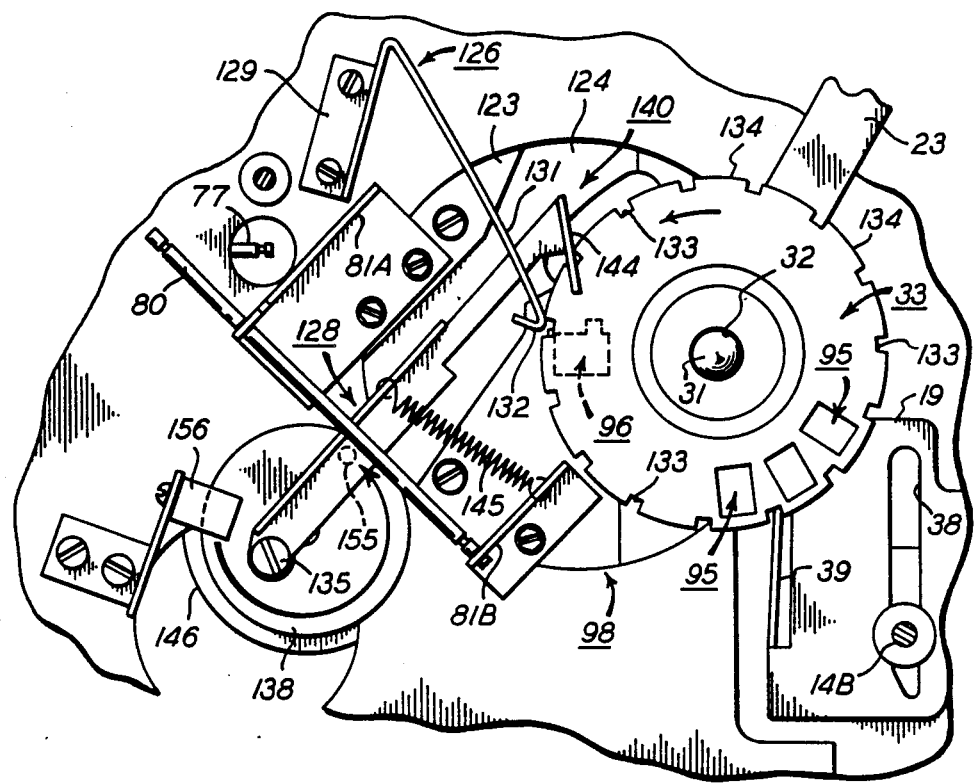
FIG. 12 is a view similar to FIGS. 10 and 11 but with the film rotational transport mechanism having angularly displaced the disc film beyond the alignment point of the next successive film frame with the exposure aperture through the film gate, as desired to assure that the rotational transport mechanism will eventually effect a precise indexing of the disc film with the desired image frame in register with the exposure aperture through the film gate; and, FIG. 13 is a partial front elevation of the head of the drive pawl taken substantially along line 13—13 of FIG. 10.

With particular reference to FIGS. 10–12, the rotational translation mechanism 125 incorporates a locating pawl 126 and a drive pawl 128. The base 129 of the locating pawl 126 is secured to the structural base plate 11, as by machine screws 130. The arm portion 131 of the locating pawl 126 is preferably resilient and may, therefore, be fabricated from spring steel. In addition, the arm portion 131 is of predetermined length in order to assure that the foot 132 of the locating pawl 126 will be selectively receivable within the successive locating notches 133 that are provided along the circumferential periphery 134 of the disc film 33 supported on the spindle 25 accurately to index the successive image frames 95 relative to the exposure aperture 96.

Figure 13:
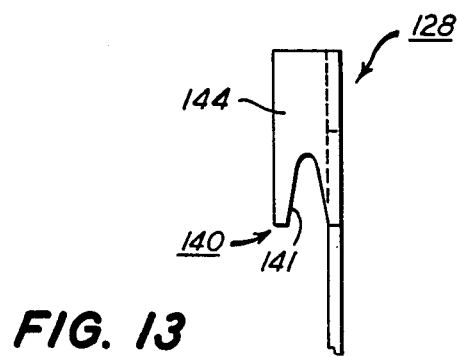

One end of the preferably rigid drive pawl 128 is pivotally secured to a crank pin 135 which is parallel to, and radially displaced from, the rotational axis 136 of a drive wheel 138. The opposite end of the drive pawl 128 terminates in a head portion 140, as best seen in FIG. 13. The head portion 140 presents a notched hook 141 that is adapted to slide along the circumferential periphery 134 of the disc film 33 and yet be capable of effecting a unidirectional driving engagement with the locating notches 133 that are provided therealong. The head portion 140 also presents an inclined cam surface 144 which precludes the head portion 140 from effecting a driving engagement with the locating notches 133 when the cam surface 144 engages the locating notches 133. A spring 145 is connected between the medial portion of the drive pawl 128 and gudgeon 81B to provide a light biasing force which holds the notched hook 141 against the circumferential periphery 134 of the disc film 33 and which urges the notched hook 141 into any locating notch 133 that aligns with the notched hook 141.

With more particular reference to FIG. 5 it will be observed that the drive wheel 138 is connected to a motor 146 by a drive shaft 148 disposed along the rotational axis 136 (FIG. 10) of the drive wheel 138. The drive wheel 138 also presents an annular cam 150 which is rotated with the drive wheel 138 by the motor 146. A follower 151 is supported from a lever arm 152 which extends outwardly from the pivot plate 78 of the film flattening assembly 75. When the follower 151 aligns to coact with portion 150A of the cam 150 the spring 76 can bias the film flattening assembly 75 to drive the film engaging mechanism against the disc film 33 or the film flattening assembly 70 can be rocked by the action of the actuating pin 70. When the cam 150 is rotated by the drive wheel 138 to bring the follower 151 toward, and into, coacting alignment with portion 150B of the cam 150, the interaction between the follower 151 and the cam 150 overcomes the biasing action of the spring 76 and rocks the film flattening assembly 75 to lift the film engaging mechanism 85 off the disc film 33.

The drive wheel is also penetrated by a locating aperture 155 (FIGS. 10–12) which permits an optical signal to be transmitted therethrough between a photoelectric source 156 and sensor 158 (see also FIG. 4). At least the sensor 158 is electrically connected to a well known signal processing unit 159, which may be mounted on the structural support plate 11 to generate an alignment signal when the optical signal is recognized by the sensor 158, as is well known to the art. In response to the recognition of the optical signal by the sensor 158, the signal processing unit 159 may also effect actuation of the means (not shown) by means to expose the image frame 95 in register with the exposure aperture 96 through the lens 160 that may be mounted on the structural base plate 11, as depicted in FIG. 4, all as will hereinafter be more fully explained in conjunction with the operational explanation.

Operation

The disc film and lens support unit 10 embodying the concept of the present invention precludes engagement of the film flattening assembly 75, including the contacting ridges 93, with the disc film 33, and particularly any portion of the disc film 33 containing an image, at any time that the disc film 33 is moved by operation of the unit 10.

It should be understood that there are two types of motion to which the disc film can be subjected by the unit 10. First, there is translational motion—that motion occasioned by the disc film support and translational transport mechanism 18 as it moves the supporting spindle 25 back and forth between the load/unload position depicted in FIG. 3 and the processing position depicted in FIG. 2. Second, there is rotational motion—that motion occasioned by the rotational translation mechanism 125 as it indexes the disc film 33 to bring successive image frames 95 into register with the exposure aperture 96 through the film gate 98.

A disc film and lens support unit 10 embodying the concepts of the present invention assures that the film engaging mechanism 85 is out of contact with the disc film 33 during both types of motion.

Figure 1:
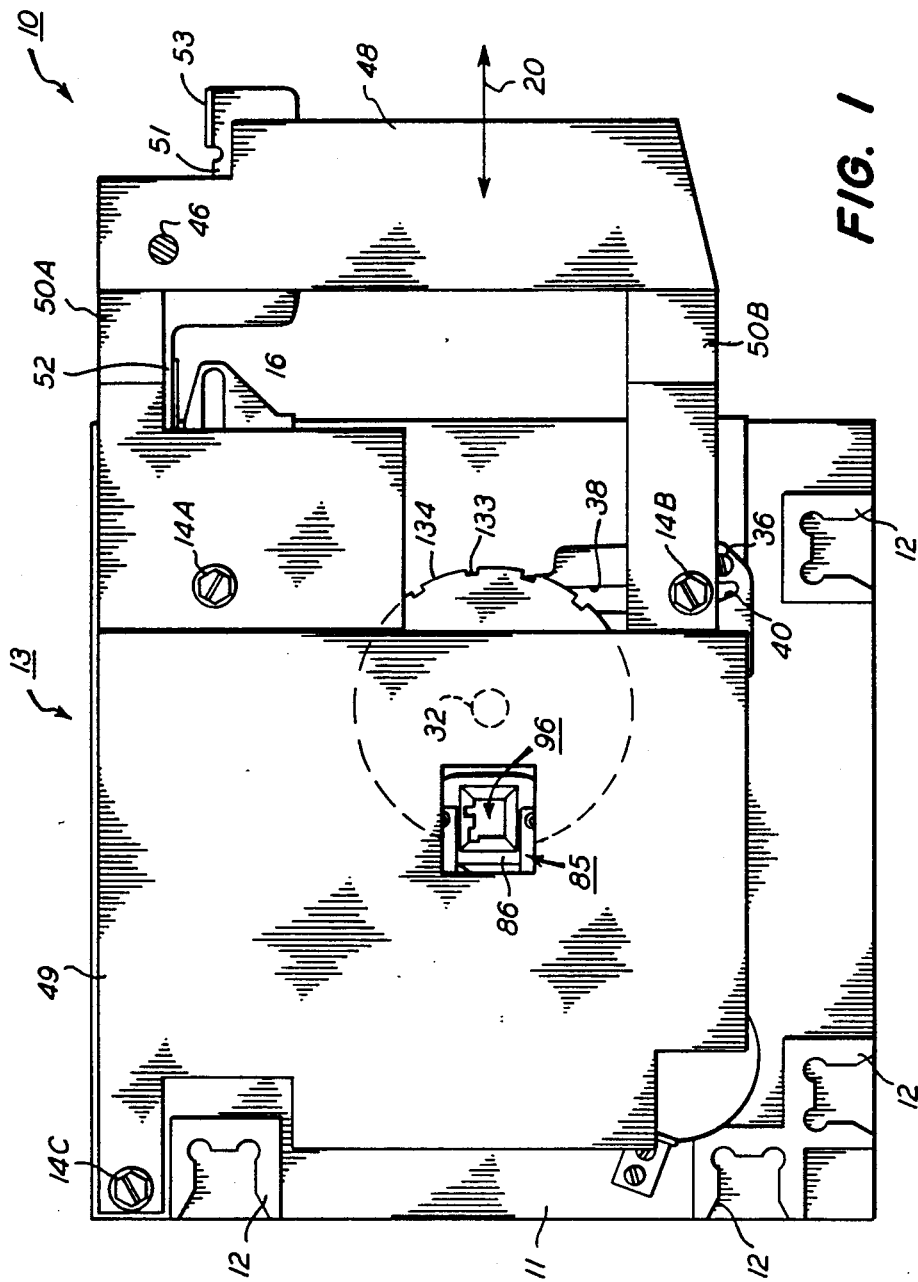
FIG. 1 is a frontal elevation of a disc film and lens supporting unit embodying the concepts of the present invention, it being understood that the designation "frontal" is, in part, an arbitrary selection to establish a frame of reference, but it should also be understood that the designation "frontal" was intentionally selected on the basis that FIG. 1 depicts the side of the unit which would face the medium upon which the image captured on the selected frame of the disc film supported within the unit would be projected by the lens associated therewith.

Turning first to an explanation as to how the desired disengagement of the film engaging mechanism 85 from the disc film 33 is attained during translational motion one may refer primarily to FIGS. 1 through 3. In FIG. 1 the disc film 33 is represented as being in the processing position, and it will be assumed that one desires to remove the disc film 33. Should the operator merely grasp the handle 48 and attempt to move the transport plate assembly 13 either forwardly or rearwardly, it will not move. This locking of the transport plate 13 is effected by engagement of the reaction pin 59 with the dogleg channel portion 58 of the guide slot 55 in the slide latch 45. On the other hand, should the operator depress the lip 53 on the slide latch 45, the slide latch 45 will rotate about the pivot pin 46 which secures the slide latch 45 to the handle 48, and that rotation of the slide latch 45 will allow the dogleg channel portion 58 to slide along the reaction pin 59 until such time as the reaction pin 59 aligns with the main channel 56 of the guide slot 55.

That same rotation of the slide latch 45 effected by depressing lip 53 with the operator's thumb causes the main channel 56 of the guide slot 55 to engage the drive pin 60 presented from the interlock lever 61, and extending through the arcuate opening 63 in the structural base plate 11, and rotate the interlock lever 61 (FIG. 4) pivotally mounted on the opposite side of the structural base plate 11. This rotation of the interlock lever 61 moves the camming ramp 72 into engagement with the actuating pin 70 (as best seen in FIG. 5) and thereby rocks the film flattening assembly 75 against the biasing action of spring 76 completely to disengage the film engaging mechanism 85 of the film flattening assembly 75 from the disc film 33 before the transport plate assembly 13 can be moved.

Movement of the transport plate assembly 13 effects translation of the disc film 33. Specifically, when the operator moves the handle 48 to slide the transport plate assembly 13 outwardly (that is, from the position depicted in FIG. 1 toward the position depicted in FIG. 3), the connecting pin 14B moves outwardly along guideway 16B smartly to rotate the lock block 19 clockwise as depicted in those FIGS., thereby disengaging the latch arm 39 from the head 27 of the supporting link 23. Simultaneously, the connecting pin 14A moves outwardly along guideway 16A to articulate the supporting link 23 and the pivot link 21 about the pivotal connecting pin 24 that joins their adjacent ends to swing the supporting spindle 25 to the load/unload position depicted in FIG. 3. At the same time, the connecting pin 14C moves along guideway 16C to provide a third connection between the transport plate assembly 13 and the structural base plate 11 so that the relative movement between those two members will be stabilized. In the load/unload position the supporting spindle 25 is readily accessible to permit a disc film to be mounted on, or removed from, the supporting spindle 25. That is, the operator merely inserts the dog 31 through the central mounting aperture 32 of the disc film 33 and snaps it over the elastic retention ring 35, or conversely lifts the disc 33 over the retention ring 35 and off the dog 31.

Reverse movement of the handle 48 slides the transport plate assembly 13 from the position depicted in FIG. 3 toward the position depicted in FIG. 2. During such movement the drive pin 60 is retained in the main channel 56 of the guide slot 55 and that disposition of the drive pin 60 maintains the interlock lever 61 disposed with the camming ramp 72 supporting the actuating pin 70 and thus maintaining the film flattening assembly 75 rocked against the biasing action of the spring 76 such that the disc film 33 can be translated into the processing position above the film gate 98 without interference by, or contact with, the film engaging mechanism 85 presented from the film flattening assembly 75.

Simultaneously with the engagement of the head 27 of the supporting link 23 against the aligning recess 110 in the film gate 98 the connecting pin 14B engages an inclined cam surface 40 at the end of the slideway 38 to rotate the lock block 19 counterclockwise as viewed in FIGS. 2 and 3 and thereby drive the latch arm 39 against the head 27 of the supporting link 23. When the dogleg channel portion 58 of the guide slot 55 aligns with the reaction pin 59, the spring 64 counterrotates the interlock lever 61 to remove the camming ramp 72 from beneath the actuating pin 70 and at the same time cause the drive pin 60 to retrorotate the slide latch 45 so that the dogleg channel portion 58 will slide along the reaction pin 59 and thereby secure the slide latch 45 and the transport plate assembly 13 against inadvertent movement. With the camming ramp 72 removed from beneath the actuating pin 70, the spring 76 will rock the film flattening assembly 75 to allow the actuating pin 70 to lower onto the offset surface 71 on the cam flange 68 of the interlock lever 61 and press the contacting ridges 93 firmly against the disc film 33.

Turning now to an explanation as to how the desired disengagement of the film flattening assembly 75 from the disc film 33 is attained during rotational motion of the disc film 33, one may refer primarily to FIGS. 10 through 12. In FIG. 10 the disc film 33 is represented as being in the processing position, and, in fact, the disc film 33 is disposed with one frame 95 in register with the exposure aperture 96. This position is secured when the foot 132 of the locating pawl 126 is firmly received within one of the locating notches 133 recessed into the circumferential periphery 134 of the disc film 33. That position is also signalled to the drive motor 146 by the angular location of the locating aperture 155 through the drive wheel 138 which permits an optical signal to be transmitted therethrough between the opposed photoelectric source 156 and sensor 158. By means well known to the art the optical signal can be utilized by a signal processing unit 159 to effect a momentary interruption to the operation of the motor 146 so the exposure of the image frame 95 aligned with the exposure aperture 96 can be made without any movement being imparted to the disc film 33 by operation of the unit 10. It should also be noted that at the time of the exposure the film engaging mechanism 85 will have the contacting ridges 93A and 93B pressed firmly against the disc film 33 outside all negative image frames 95, and the notched hook 141 on the head portion 140 of the drive pawl 128 will be located between successive notches 133 in the circumferential periphery 134 of the disc film 33.

Subsequent to the exposure, the signal processing unit 159 will cause the motor 146 to resume operation and continue to turn the drive wheel 138 counterclockwise as viewed in FIGS. 10 through 12 which will continue to slide the notched hook 141 on the head portion 140 of the drive pawl 128 along the circumferential periphery 134 of the disc film 33. As the drive wheel 138 rotates through the position when the drive pawl 128 is extended to its utmost degree (the position when the crank pin 135 is aligned with the rotational axis of the drive wheel 138 and the longitudinal axis of the drive pawl 128), the spring 145 will cause the notched hook 141 to drop into a locating notch 133. Continued counterclockwise rotation of the drive wheel 138 will move the crank pin 135 circumferentially and that motion will effect movement to the drive pawl 128 which will rotate the disc film 33. However, before the disc film 33 even begins to rotate, the annular cam 150 on the reverse side of the drive wheel 138 will displace the follower 151 to rock the film flattening assembly 75 against the biasing action of the spring 76 to lift the film engaging mechanism 85. The undulating actuating surface on the annular cam 150 is designed, and located, to maintain the film flattening assembly 75 totally out of contact with the disc film 33 throughout the entire rotational movement of the disc film 33 as the disc is indexed to bring the next successive image frame 95 into alignment with the exposure aperture 96 through the film gate 98.

When the drive wheel 138 has rotated to bring the crank pin 135 into that position which will define the furthermost displacement of the drive pawl 128, as depicted in FIG. 12, the notched hook 141 on the head portion 140 of the locating pawl 128 will appear to have overrun the appropriate notch 133. However, that intermediate position was carefully selected to assure the proper seating of the foot 132 on the locating pawl 126 within the appropriate notch 133 necessary precisely to register the selected image frame 95 with the exposure aperture 96 through the film gate 98.

Continued rotation of the drive wheel 138 will initiate a longitudinal extension of the drive pawl 128 so that as the angled cam surface 144 on the head portion 140 of the drive pawl 128 engages the side of the notch 133 the drive pawl 128 will swing against the biasing pressure applied by the spring 145 to allow the notched hook 141 to be displaced radially outwardly until the notched hook 141 can ride along the circumferential periphery 134 of the disc film 33. The movement of the notched hook 141 against the far edge 160 the notch 133 will tend to rotate the disc film 33 in a clockwise direction, but that movement will be arrested as soon as the foot 132 on the locating pawl 126 is firmly seated within the notch 133.

When the foot 132 is firmly seated within the notch 133, the annular cam 150 will release the follower 151 and allow the biasing action of spring 76 to rock the film flattening assembly 75 to bring the contacting ridges 93 into engagement with the disc film 33 so that the disc will be immobilized for exposure of the image frame 95 then in register with the exposure aperture 96 through the film gate 98. Continued rotation of the drive wheel 138 will bring the locating aperture into alignment with the photoelectric source 156 and sensor 158 to expose the next image frame and thus complete the cycle heretofore explained.

It should now be apparent that a disc film and lens supporting unit embodying the concepts of the present invention assures that a film flattening assembly will firmly immobilize the disc during exposure of each image frame but will also assure that the film flattening assembly is totally out of contact with the disc film during both the required translational movement of the disc film as it moves between the load/unload positions and the required rotational movement as the disc film is indexed to align successive image frames for exposure and otherwise accomplishes the objects of the invention.

I claim:

1. A disc film and lens supporting unit comprising:
   a structural base plate;
   an exposure aperture extending through said structural base plate;
   a spindle to support a disc film in register with said exposure aperture;
   means to move the disc film and the spindle laterally between first and second spaced positions;
   means to move the disc film rotationally about said spindle relative to said exposure aperture;
   film engaging means normally engaged to flatten the disc film transversely of said exposure aperture; and,
   means connected to said lateral spindle movement means and to said rotational disc movement means to disengage said film engaging means from the disc film and to prevent movement of the disc film before disengagement.

2. A disc film and lens supporting unit, as set forth in claim 1, wherein:
   the means to move the disc film relative to said exposure aperture effects rotational translation of the disc film.

3. A disc film and lens supporting unit comprising:
   a structural base plate;
   an exposure aperture extending through said structural base plate;
   a spindle to support a disc film in register with said exposure aperture;
   means to effect rotational translation of the disc film relative to said exposure aperture;
   a film engaging mechanism to flatten the disc film transversely of said exposure aperture; and,
   interlock means to prevent movement of the disc film relative to said exposure aperture before disengagement of the film engaging means from the disc film;
   wherein the means to move the disc film further comprises:
   a drive pawl to effect the rotational translation of the disc film;
   drive means to actuate said drive pawl; and,
   means associated with said drive means to actuate said interlock means in preventing movement of the disc film relative to said exposure aperture before disengagement of the film engaging means from the disc film.

4. A disc film and lens supporting unit, as set forth in claim 3, wherein:
   said drive pawl effects rotational translation of the disc film to index the disc film between successive locations relative to said exposure aperture; and,
   a locating pawl is provided operatively to engage the disc film precisely to register the disc film relative to said exposure aperture at the conclusion of each indexing rotation effected by said drive pawl.

5. A disc film and lens supporting unit, as set forth in claim 4, wherein said drive means further comprises:
   a drive wheel; and,
   a crank pin presented eccentrically from said drive wheel and being operatively connected to said drive pawl.

6. A disc film and lens supporting unit, as set forth in claim 4, for use with a disc having locating notches in its circumferential periphery, and wherein:
   a head portion is presented from said drive pawl;
   said head portion has a hook means to engage the locating notches; and,
   said head portion also has an inclined cam to engage the locating notches to release the head portion from the locating notches when said drive pawl moves in a direction that would otherwise tend to induce counterrotation of the disc film.

7. A disc film and lens supporting unit, as set forth in claim 4, for use with a disc having locating notches in its circumferential periphery, and wherein:
   the locating pawl presents a foot which engages successive locating notches precisely to locate the disc film relative to the exposure aperture.

8. A disc film and lens supporting unit, as set forth in claim 6, wherein:
   spring means bias the drive pawl toward engagement with the circumferential periphery of the disc film.

9. A disc film and lens supporting unit, as set forth in claim 7, wherein:
   said locating pawl has a resilient arm portion of preselected length to assure an accurately repeatable interaction between said foot and the locating notches in the disc film and thereby effect a precise indexing of the disc film relative to said exposure aperture.

10. A disc film and lens supporting unit, as set forth in claim 5, wherein:
said film engaging mechanism is carried on a film flattening assembly;
a cam means is presented from said drive wheel; and,
a follower is presented from said film flattening assembly to effect timely engagement, and disengagement, of said film engaging mechanism with the disc film.

11. A disc film and lens supporting unit, as set forth in claim 10, wherein:
said film flattening assembly is mounted from said structural base plate for rocking movement;
spring means bias said film flattening assembly to rock in that direction which brings said film engaging mechanism into contact with the disc film; and,
the interaction of said cam with said follower rocks said film flattening assembly in that direction which disengages said film engaging mechanism from the disc film.

12. A disc film and lens supporting unit, as set forth in claim 11, wherein:
said cam means carried on said drive wheel is an annular cam; and,
said follower is supported from said film flattening assembly.

13. A disc film and lens supporting unit, as set forth in claim 5, wherein:
a locating aperture penetrates said drive wheel;
signal source means and sensing means are provided to oppose each other across said drive wheel;
a signal processing unit is operatively connected to at least said sensing means;
said locating aperture permits a signal to pass between said signal source means and said sensing means when said locating aperture is aligned therewith; and,
said processing unit is adapted momentarily to interrupt the operation of said drive wheel upon the receipt by said sensor means of a signal through said locating aperture.

14. A disc film and lens supporting unit, as set forth in claim 1, further comprising:
a film gate presented from said structural base plate;
said exposure aperture extending through said film gate; and,
said film gate presenting a raised rim which circumscribes said exposure aperture and upon which the disc film rests.

15. A disc film and lens supporting unit, as set forth in claim 14, wherein said film engaging mechanism further comprises:
a mask; and,
contacting ridges presented from said mask, said contacting ridges being opposed to said raised rim to flatten the disc film therebetween.

16. A disc film and lens supporting unit comprising:
a structural base plate;
an exposure aperture extending through said structural base plate;
a spindle to support a disc film in register with said exposure aperture;
a disc film support and translational transport mechanism carried on said structural base plate to translate said spindle between a first "load/unload" position displaced from said exposure aperture, at which position a disc film can be demountably positioned on said spindle, and a second "processing" position, at which position the disc film is appropriately in register with said exposure aperture;
a film engaging mechanism to flatten the disc film transversely of said exposure aperture; and,
interlock means to prevent movement of the disc film relative to said exposure aperture by said support and transport mechanism before disengagement of the film engaging means from the disc film.

17. A disc film and lens supporting unit, as set forth in claim 16, wherein:
a transport plate assembly is movably mounted on said structural base plate; and,
said disc film support and translational transport mechanism is actuated to move said spindle between said first and second positions in response to selected movement of said transport plate assembly.

18. A disc film and lens supporting unit, as set forth in claim 17, wherein:
said interlock means prevents movement of said transport plate assembly until said film engaging means has been disengaged from the disc film.

19. A disc film and lens supporting unit, as set forth in claim 18, wherein said interlock means comprises:
a slide latch supported from said transport plate assembly;
slide latch engaging means on said structural base plate to prevent movement of said transport plate assembly when said spindle is in the second position; and,
means manually to disengage said slide latch from said slide latch engaging means so as to permit said transport plate to move and thereby translate said spindle from the second position to said first position.

20. A disc film and lens supporting unit, as set forth in claim 18, wherein said interlock means comprises:
a slide latch supported from said transport plate assembly;
a guide slot provided in said slide latch;
a reaction pin presented from said structural base plate;
the interaction between said guide slot and said reaction pin normally preventing movement of said transport plate assembly when said spindle is in the second position; and,
means manually to manipulate said slide latch to negate the interaction between said guide slot and said reaction pin in order to permit said transport plate to move and thereby translate said spindle from the second position to said first position.

21. A disc film and lens supporting unit, as set forth in claim 18, wherein said interlock means comprises:
a slide latch supported from said transport plate assembly;
a guide slot provided in said slide latch;
said guide slot incorporating a main channel and a dogleg channel portion;
a reaction pin presented from said structural base plate;
the interaction between said dogleg channel portion of said guide slot and said reaction pin normally preventing movement of said transport plate assembly when said spindle is in the second position; and, means manually to manipulate said slide latch to align said reaction pin with said main channel portion of said guide slot in order to permit said transport plate to move and thereby translate said spindle from the second position to said first position.

22. A disc film and lens supporting unit, as set forth in claim 18, wherein said interlock means comprises:
a slide latch pivotally mounted from said transport plate assembly;
that portion of said slide latch on one side of the pivotal mounting to said transport plate assembly constituting an actuating lever and that portion on the other side constituting a throw lever;
a guide slot provided in said throw lever portion of said slide latch,
said guide slot incorporating a main channel and a dogleg channel portion;
a reaction pin presented from said structural base plate;
the interaction between said dogleg channel portion of said guide slot and said reaction pin normally preventing movement of said transport plate assembly when said spindle is in the second position; and,
manual manipulation of said actuating lever portion of said slide latch rotating said slide latch to disengage said reaction pin from said dogleg channel portion and thereby align said reaction pin with said main channel portion of said guide slot in order to permit said transport plate to move and thereby translate said spindle from the second position to said first position.

23. A disc film and lens supporting unit, as set forth in claim 22, wherein said interlock means further comprises:
an interlock lever having opposed end portions and a medial portion located therebetween;
means pivotally mounting the medial portion of said interlock lever to said structural base plate;
a drive pin presented from one end portion of said interlock lever, said drive pin received within said main channel portion of said guide slot; and,
means at the opposite end portion of said interlock lever to effect disengagement of said film disengaging means from the disc film.

24. A disc film and lens supporting unit, as set forth in claim 23, wherein:
the means at the opposite end portion of said interlock lever incorporates a cam flange;
said film flattening assembly is mounted from said structural base plate for rocking movement;
spring means bias said film flattening assembly to rock in that direction which brings said film engaging mechanism into contact with the disc film; and,
an actuating pin is engaged by said cam flange such that manual manipulation of said slide latch axially displaces said actuation pin to rock said film flattening assembly in that direction which disengages said film engaging mechanism from the disc film.

25. A disc film and lens supporting unit, as set forth in claim 24, wherein:
a spring means biases said interlock lever to maintain said drive pin in engagement with said main channel of said guide slot and thereby bias said slide latch to retain said reaction pin within said dogleg channel portion until said slide latch has been manually manipulated.

26. A disc film and lens supporting unit, as set forth in claim 25, wherein:
said cam flange incorporates a camming ramp;
said camming ramp is brought into engagement with said actuating pin axially to translate said actuating pin and thereby disengage said film engaging mechanism from said disc film when said slide latch has been manually manipulated to remove said reaction pin from engagement within said dogleg portion of said guide channel.

27. A disc film and lens supporting unit, as set forth in claim 26, wherein:
a film gate is presented from said structural base plate, and said exposure aperture extends through said film gate;
an aligning recess is presented in said film gate;
said spindle engages said aligning recess to determine the second position of said spindle.

28. A disc film and lens supporting unit comprising:
a structural base plate;
an exposure aperture extending through said structural base plate;
a spindle to support a disc film in register with said exposure aperture;
a disc film support and translational transport mechanism carried on said structural base plate to translate said spindle between a first "load/unload" position displaced from said exposure aperture, at which position a disc film can be demountably positioned on said spindle, and a second "processing" position, at which position the disc film is appropriately in register with said exposure aperture;
means to effect rotational translation of the disc film relative to said exposure aperture when said spindle is in said second position;
a film engaging mechanism to flatten the disc film transversely of said exposure aperture; and,
interlock means to prevent movement of the disc film relative to said exposure aperture by said transport mechanism and said rotational translating means before disengagement of the film engaging means from the disc film.

29. A disc film and lens supporting unit, as set forth in claim 28, wherein:
a transport plate assembly is movably mounted on said structural base plate in cooperation with said support and transport mechanism so that selected movement of said transport plate assembly effects movement of said support and transport mechanism to translate said spindle between said first and second positions;
said rotational translation means comprises a drive pawl and drive means to actuate said drive pawl;
said interlock means comprises first and second interlock means to prevent movement of the disc film relative to said exposure aperture before disengagement of the film engaging means from the disc film;
means associated with said transport plate assembly is provided to actuate and release said first interlock means; and,
means associated with said drive means is provided to actuate and release said second interlock means.

30. A disc film and lens supporting unit, as set forth in claim 29, wherein said first interlock means further comprises:
a slide latch supported from said transport plate assembly;

slide latch engaging means on said structural base plate to prevent movement of said transport plate assembly when said spindle is in the second position; and, means manually to disengage said slide latch from said slide latch engaging means so as to permit said transport plate to move and thereby translate said spindle from the second position to said first position.

31. A disc film and lens supporting unit, as set forth in claim 30, wherein:

said drive pawl in said second interlock means effects rotational translation to index the disc film between successive locations relative to said exposure aperture; and, a locating pawl is provided in said second interlock means operatively to engage the disc film precisely to register the disc film at successive locations relative to said exposure aperture to which said drive pawl indexes the disc film.

32. A disc film and lens supporting unit, as set forth in claim 31, wherein said drive means further comprises:

a drive wheel; and, a crank pin presented eccentrically from said drive wheel and being operatively connected to said drive pawl.

33. A disc film and lens supporting unit, as set forth in claim 32, for use with a disc having locating notches in its circumferential periphery, and comprising:

a head portion presented from said drive pawl;

said head portion having a hook means to engage the locating notches; and, said head portion also having an inclined cam to engage the locating notches to release the head portion from the locating notches when said drive pawl moves in a direction that would otherwise tend to induce counterrotation of the disc film.

34. A disc film and lens supporting unit, as set forth in claim 33, wherein:

said slide latch engaging means further comprises a guide slot provided in said slide latch, and a reaction pin presented from said structural base plate;

the interaction between said guide slot and said reaction pin normally preventing movement of said transport plate assembly when said spindle is in the second position; and, said means manually to disengage further comprises means manually to manipulate said slide latch to negate the interaction between said guide slot and said reaction pin in order to permit said transport plate to move and thereby translate said spindle from the second position to said first position.

35. A disc film and lens supporting unit, as set forth in claim 34, wherein:

said guide slot incorporates a main channel and a dogleg channel portion;

the interaction between said dogleg channel portion of said guide slot and said reaction pin preventing movement of said transport plate assembly when said spindle is in the second position; and, wherein said means manually to manipulate further comprises means manually to manipulate said slide latch to align said reaction pin with said main channel portion of said guide slot in order to permit said transport plate to move and thereby translate said spindle from the second position to said first position.

* * * * *

UNITED STATES PATENT AND TRADEMARK OFFICE
CERTIFICATE OF CORRECTION

PATENT NO. : 4,853,751
DATED     : August 1, 1989
INVENTOR(S) : James D. Riall

It is certified that error appears in the above-identified patent and that said Letters Patent is hereby corrected as shown below:

| | |
|---|---|
| Column 1, Line 52 | "herein" should read --therein-- |
| Column 7, Line 37 | "when" should read --When-- |
| Column 8, Lines 29-30 | "apertures" should read --aperture-- |
| Column 8, Line 31 | "aperture" should read --apertures-- |
| Column 10, Line 14 | second appearance of "means" should read --which-- |

Signed and Sealed this

Ninth Day of April, 1991

Attest:

HARRY F. MANBECK, JR.

Attesting Officer

Commissioner of Patents and Trademarks